United States Patent [19]

Kashiwase

[11] Patent Number: 5,206,838
[45] Date of Patent: Apr. 27, 1993

[54] ULTRASONIC TRANSDUCER
[75] Inventor: Yutaka Kashiwase, Tokyo, Japan
[73] Assignee: Tokimec Inc., Tokyo, Japan
[21] Appl. No.: 914,595
[22] Filed: Jul. 20, 1992
[30] Foreign Application Priority Data
  Jul. 29, 1991 [JP] Japan .................. 3-211656
  Jul. 13, 1992 [JP] Japan .................. 4-208524
[51] Int. Cl.[5] ........................... G01S 15/00
[52] U.S. Cl. ...................... 367/99; 367/127
[58] Field of Search .......... 367/99, 97, 27, 87, 367/127; 364/724.1, 723

[56] References Cited
U.S. PATENT DOCUMENTS
  4,365,320 12/1982 Beauducel et al. .............. 367/27

Primary Examiner—Daniel T. Pihulic
Attorney, Agent, or Firm—Sandler Greenblum & Bernstein

[57] ABSTRACT

An ultrasonic transducer is provided with an ultrasonic transmitter; an ultrasonic receiver; and a propagation-delay-time calculating device for calculating a propagation delay time from the time when an ultrasonic wave is transmitted by the transmitter until the time when the ultrasonic wave is received by the receiver. The propagation-delay-time calculating device includes: a waveform storage section in which a waveform signal of the ultrasonic wave received by the ultrasonic receiver is converted to a digital value after sampling at a predetermined timing and is stored sequentially; a virtual-zero-crossing-position detecting unit for detecting a virtual zero-crossing point on the basis of the waveform signal stored; a regression-line calculating unit or a regression curve calculating unit for estimating a zero-crossing point of the received wave by fetching from the waveform storage section waveform data at a plurality of addresses centering on an address shown by an output of the virtual-zero-crossing-position detecting unit, and by effecting a regression-line interpolation or a regression-curve interpolation with respect to the waveform data; and a propagation-delay-time calculating section for calculating the propagation delay time of the ultrasonic wave received on the basis of the zero-crossing point estimated.

10 Claims, 8 Drawing Sheets (REAL ZERO-CROSSING POINT, Z)

(REAL ZERO-CROSSING POINT, Z)

ULTRASONIC TRANSDUCER

BACKGROUND OF THE INVENTION

1. Field of the Invention

The present invention relates to an ultrasonic transducer for measuring the propagation delay time and the like by propagating ultrasonic waves to an object to be measured.

2. Description of the Related Art

In general, ultrasonic measuring instruments, such as ultrasonic rangefinders and ultrasonic flowmeters, are so arranged as to output ultrasonic waves of a predetermined frequency from an ultrasonic transducer., detect reflected or transmitted waves thereof, convert the same into an electrical signal, and calculate the propagation delay time and the like on the basis of the received signal detected. As for this propagation delay time, a time interval between the time of transmission and the time of reception of a pulse is conventionally determined by the count of clock pulses included in that time interval. Accordingly, a time duration shorter than that corresponding to one clock pulse is ignored, with the result that a quantization error has conventionally occurred by that portion of time.

As a means for overcoming the above-described problem, Japanese Patent Application Laid Open No. 225027/1985 discloses an apparatus in which the time duration shorter than that corresponding to one clock pulse is determined by integrating a time duration from the time of transmission of a pulse to the rise of a clock pulse and a time duration from the time of reception of the pulse to the rise of a clock pulse by means of an integrator, so as to correct that portion of time.

With this prior art, however, since an analog circuit including an integrator and the like is used, a lamp voltage of the integrator changes due to a change with time and a temperature change, which disadvantageously results in an error.

SUMMARY OF THE INVENTION

Accordingly, an object of the present invention is to provide an ultrasonic transducer which is capable of measuring the ultrasonic propagation delay time with high resolution by using a relatively low-speed, low-resolution A/D converter, thereby overcoming the above-described drawbacks of the conventional art.

To this end, in accordance with the present invention, there is provided an ultrasonic transducer comprising: an ultrasonic transmitter; an ultrasonic receiver; and propagation-delay-time calculating means for calculating a propagation delay time from the time when an ultrasonic wave is transmitted by the transmitter until the time when the ultrasonic wave is received by the receiver, wherein the propagation-delay-time calculating means includes: a waveform storage section in which a waveform signal of the ultrasonic wave received by tHe ultrasonic receiver is converted to a digital value after sampling at a predetermined timing and is stored sequentially; a virtual-zero-crossing-position detecting unit for detecting a virtual zero-crossing point on the basis of the waveform signal stored; a regression-line calculating unit for estimating a zero-crossing point of the received wave by fetching from the waveform storage section waveform data at a plurality of addresses centering on an address shown by an output of the virtual-zero-crossing-position detecting unit, and by effecting a regression-line interpolation with respect to the waveform data; and a propagation-delay-time calculating section for calculating the propagation delay time of the ultrasonic wave received on the basis of the zero-crossing point estimated.

In addition, in accordance with another aspect of the present invention, an arrangement may be alternatively adopted such that a regression-curve calculating unit is provided instead of the regression-line calculating unit to effect a regression-curve interpolation, so as to calculate the propagation delay time of the ultrasonic wave on the basis of the zero-crossing point estimated by the regression-curve interpolation.

As described above, in the present invention, after the waveform signal of the ultrasonic wave received is sampled at a predetermined timing and is stored sequentially, a virtual zero-crossing point is determined on the basis of a waveform data train stored. A real zero-crossing-point timing is then calculated on the basis of the waveform data at a plurality of addresses centering on that virtual zero-crossing point by means of a regression-line interpolation or a regression-curve interpolation. Thus, as the real zero-crossing-point timing is calculated, the resolution is improved over that based on the sampling period of the waveform storage section to measure the propagation delay time of the ultrasonic wave.

The above and other objects, features and advantages of the present invention will become more apparent from the following detailed description of the invention when read in conjunction with the accompanying drawings.

DESCRIPTION OF THE PREFERRED EMBODIMENTS

Figure 1:
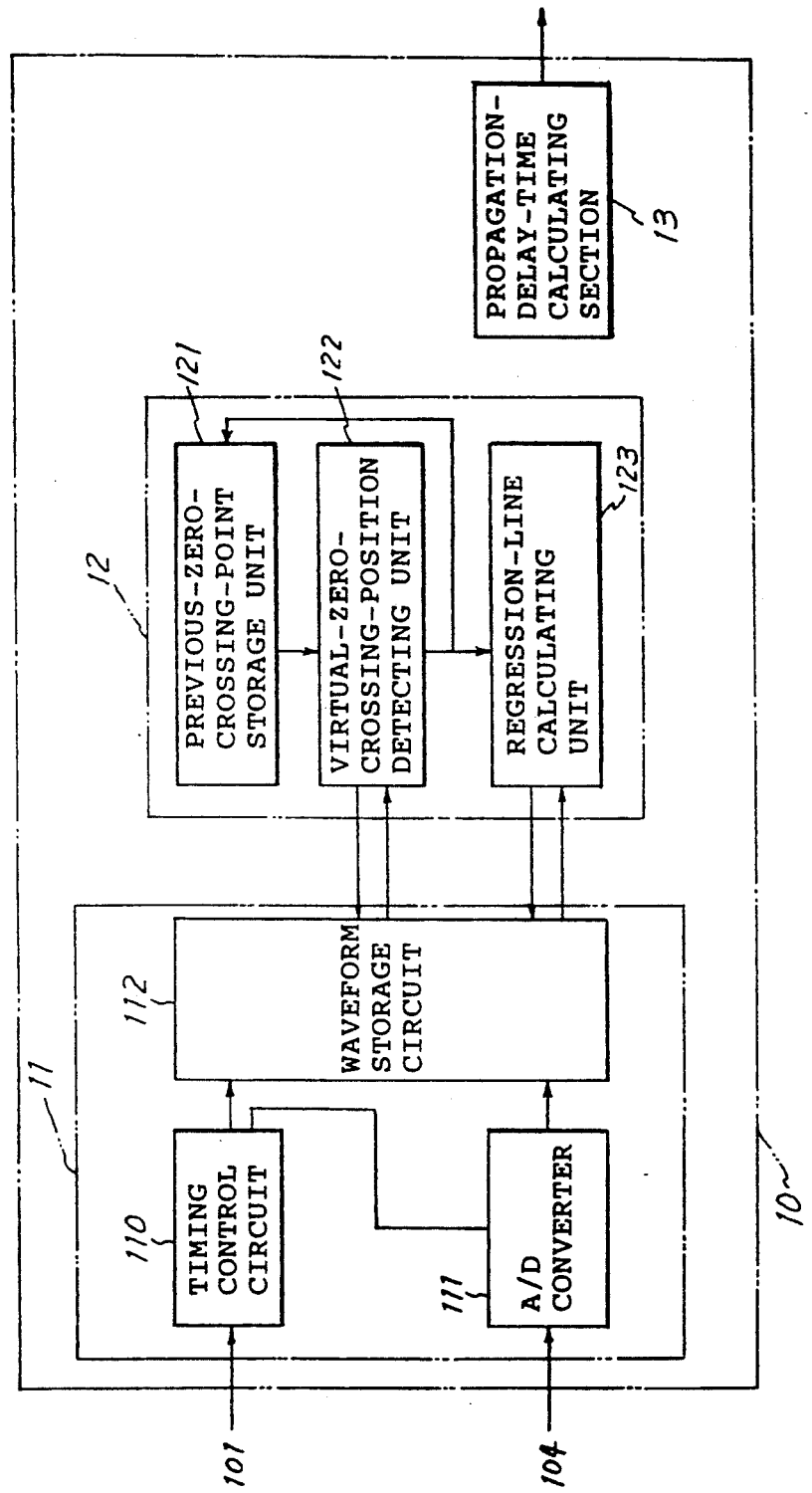
FIG. 1 is a block diagram of essential portions of an embodiment of the present invention.
Figure 2:
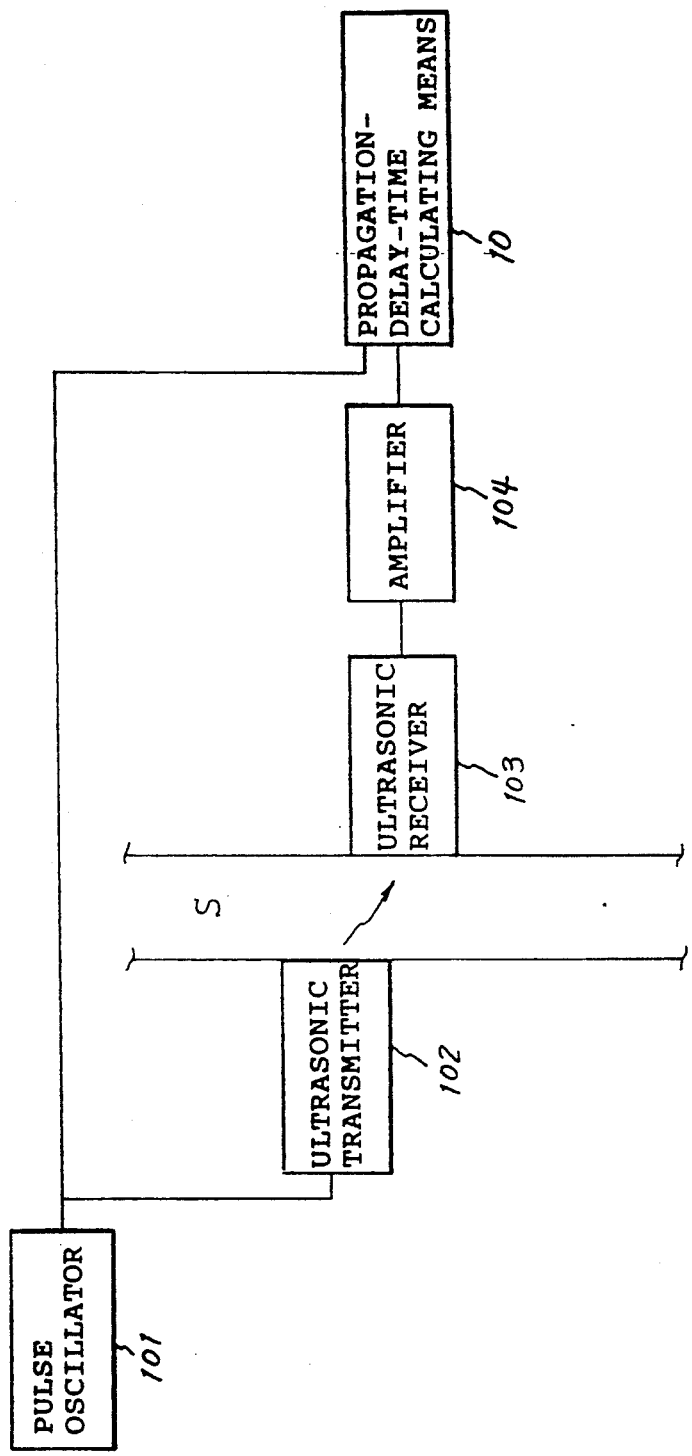
FIG. 2 is a block diagram of the configuration of an overall apparatus incorporating the blocks shown in FIG. 1.

Referring now to FIGS. 1 to 7, a description will be given of a first embodiment of the present invention. The embodiment shown in FIG. 2 comprises a pulse oscillator 101 for generating a transmission pulse at a predetermined period; an ultrasonic transmitter 102 driven by the pulse transmitted from the pulse oscillator 101; and an ultrasonic receiver 103 for receiving via an object S to be measured an ultrasonic signal outputted from the ultrasonic transmitter 102.

After the ultrasonic signal received by the ultrasonic receiver 103 is converted to an electrical signal, the electrical signal is amplified by an amplifier 104 and is sent to a propagation-delay-time calculating means 10. In this propagation-delay-time calculating means 10, the propagation delay time of the ultrasonic wave received is calculated from both the received signal from the amplifier 104 and the transmitted pulse from the pulse oscillator 101.

FIG. 1 shows a specific example of the propagation-delay-time calculating means 10. The propagation-delay-time calculating means 10 comprises a waveform storage section 11, a zero-crossing-position detecting section 12, and a propagation-delay-time calculating section 13. The waveform storage section 11 includes the following: a timing control circuit 110 for generating a write pulse train, which is a square-wave pulse train of a fixed period, at a predetermined timing, i.e., after the lapse of a fixed time, upon being triggered by the transmitted pulse from the pulse oscillator 101; an A/D converter 111 to which the received signal from the amplifier 104 is inputted and which, after sampling, converts the received signal to a waveform data train consisting of digital values; and a waveform storage circuit 112 which stores the waveform data train outputted from the A/D converter 111, in a predetermined sequence at a predetermined address in synchronism with the write pulse train, and which reads and outputs the waveform data at an arbitrary address in an arbitrary sequence in response to a request from the zero-crossing-position detecting section 12. It should be noted, however, that if the storage capacity of the waveform storage circuit 112 is abundant, the write pulse train may be generated simultaneously with the transmitted pulse.

The zero-crossing-position detecting section 12 includes the following: a previous-zero-crossing-point storage unit for storing a virtual zero-crossing point received during previous reception; a virtual-zero-crossing-position detecting unit 122 for determining a virtual zero-crossing point on the basis of the previous zero-crossing point; and a regression-line calculating unit 123 for calculating a real zero-crossing point with high resolution.

Figure 3:
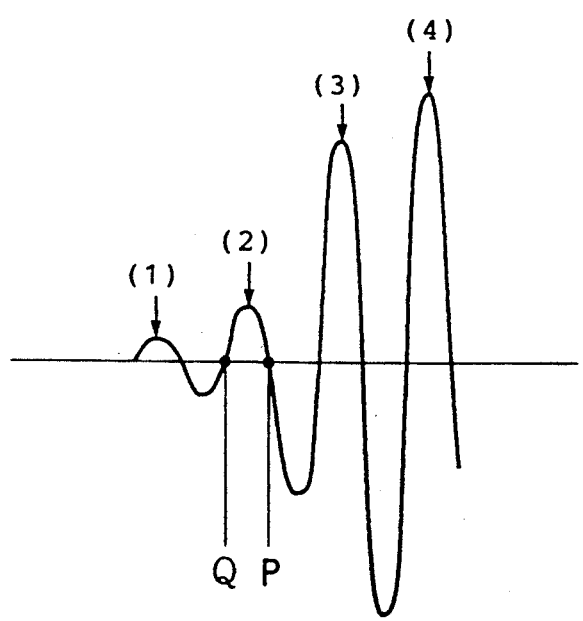
FIG. 3 is a diagram of the reception waveform illustrating a method of inspecting an initial zero-crossing point.

The previous zero-crossing-point storage unit 121 has the function of storing the previous zero-crossing-point address received during previous reception. Here, a description will be given of a method of determining a virtual zero-crossing point at the time of a first measurement, i.e., an initial zero-crossing point. FIG. 3 shows an example of reception waveform data, in which wave ridges are sequentially numbered starting with (1). Ratios of peak values of adjacent ridges are determined, and a first-appearing ridge in the combination, which displays a maximum ratio, of adjacent ones of wave ridges is set as a trigger wave. In the example shown in FIG. 3, since the ratio of the peak values of the wave ridges (2) and (3) is maximum, the wave ridge (2) is set as the trigger wave. The zero-crossing point of the wave ridge (2) is a point P in FIG. 3. In this case, the waveform data is consecutively searched in a forward direction starting with the address of data close to the peak of the ridge (2), and the address whose code changes first from positive to negative is set as an initial zero-crossing point. This address is stored in the previous zero-crossing-point storage unit 121 as a previous zero-crossing-point address of a first measurement.

Subsequently, the content of the previous-zero-crossing-point storage unit 121 is overwritten by a most recent virtual-zero-crossing-point address detected by the virtual-zero-crossing-position detecting unit 122.

Referring now to FIGS. 4 to 7, a description will be given of an algorithm of detecting the virtual zero-crossing point.

Figure 4:
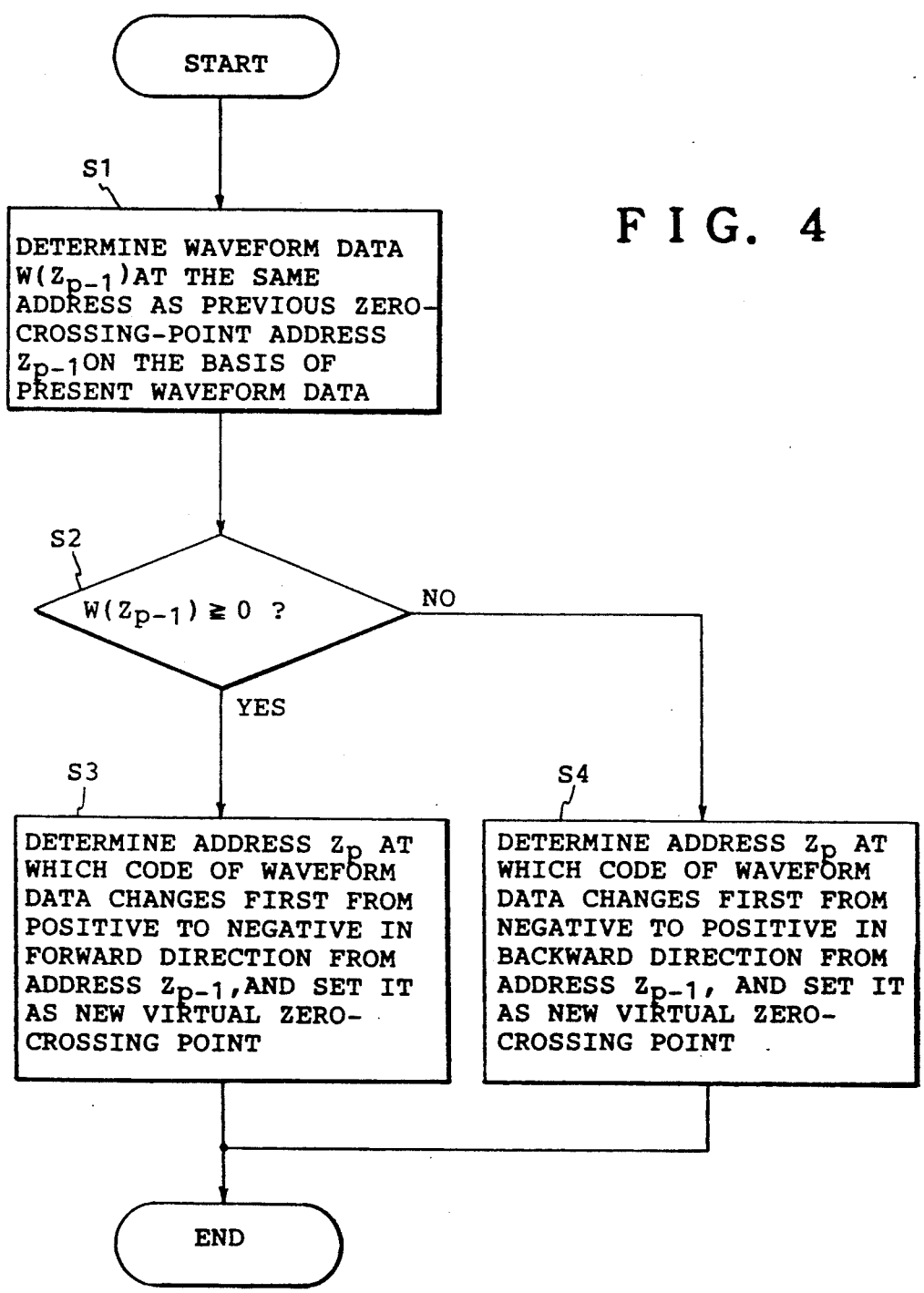
FIG. 4 is a flowchart illustrating the operation of a virtual-zero-crossing-point detecting unit shown in FIG. 1.

FIG. 4 shows an algorithm of detecting the virtual zero-crossing point. In the drawing, S1 to S4 denote steps of this algorithm. In a first step S1, in the waveform data received during the present reception, the waveform data W ($Z_{p-1}$) at an address $Z_{p-1}$ of the previous zero-crossing point shown by the previous-zero-crossing-point storage unit 121 is determined. Here, the suffix p−1 means that the data is data of a (p−1)th measurement. In a second step S2, a determination is made as to whether this data W ($Z_{p-1}$) is positive or negative.

Figure 5:
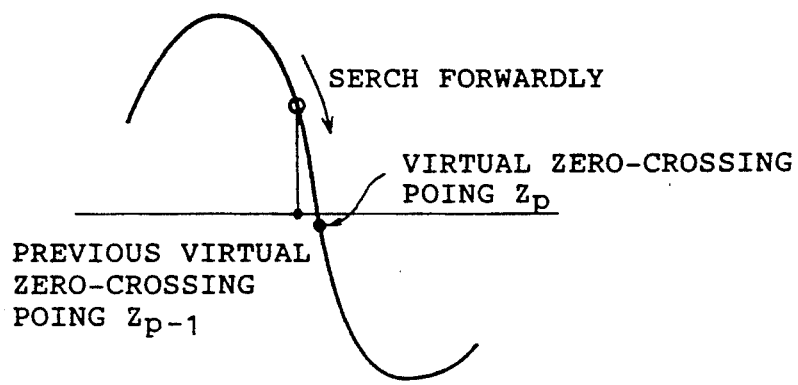
FIG. 5 is an explanatory diagram illustrating the operation of Step S3 in FIG. 4.
Figure 6:
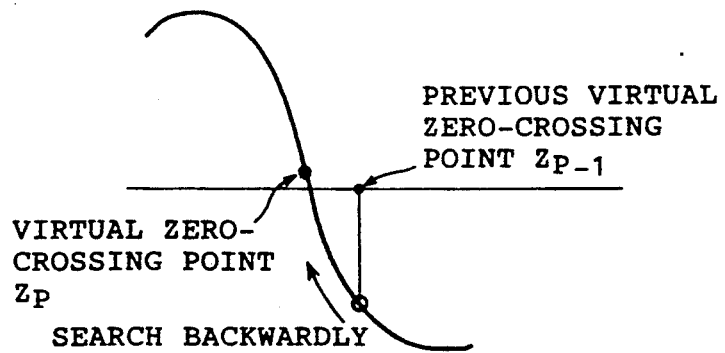
FIG. 6 is an explanatory diagram illustrating the operation of Step S4 in FIG. 4.

If the waveform data W ($Z_{p-1}$) is positive or 0, the processing of a third step S3 is selected. In the third step S3, a determination is made that the zero-crossing point has shifted in the forward direction, as shown in FIG. 5, and an address Zp at which the code of the waveform data changes from + to − is searched in the forward direction from the address $Z_{p-1}$, and this address Zp is set as a new virtual zero-crossing point. Here, the suffix p means that the data is the present data, i.e., the data of a p-th measurement. Meanwhile, if the waveform data W ($Z_{p-1}$) is negative in the second step S2, the processing of a fourth step S4 is selected. In the fourth step S4, a determination is made that the zero-crossing point has shifted in a backward direction, as shown in FIG. 6, and an address Zp at which the code of the waveform data changes from − to + is searched in the backward direction form the address $Z_{p-1}$, and this address Zp is set as a new virtual zero-crossing point.

Figure 7:
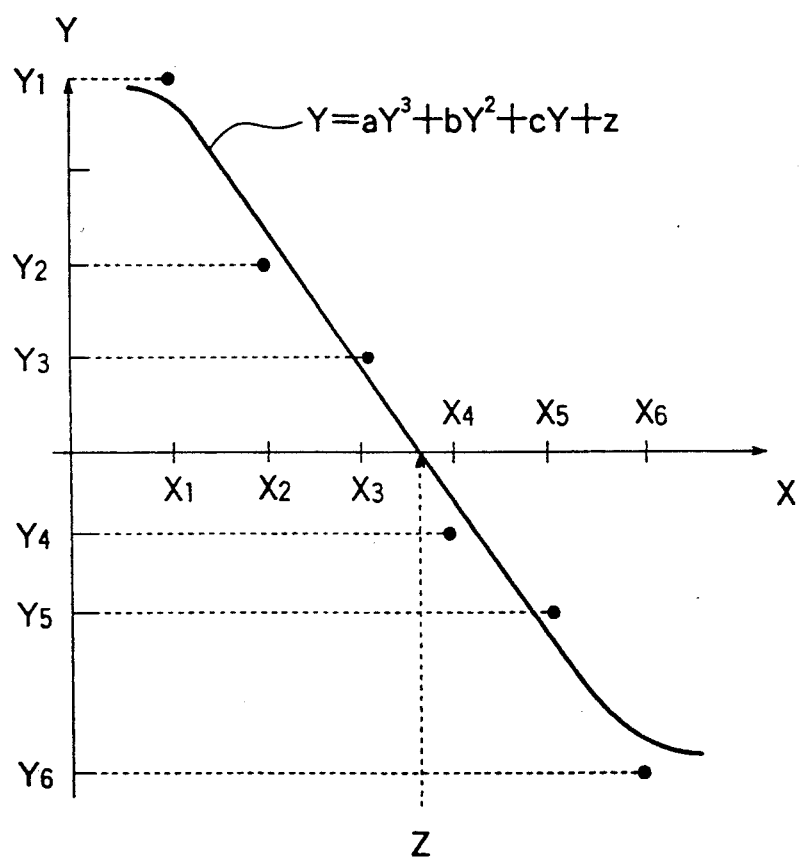
FIG. 7 is an explanatory diagram illustrating the operation of a regression-line calculating unit shown in FIG. 1.

The aforementioned virtual zero-crossing point detected by the virtual-zero-crossing-position detecting unit is, in a strict sense of the term, an address immediately after inversion of the code, and does not precisely correspond to a timing when the received signal has become a 0. In addition, since amplitude values of the respective waveform data are values quantized by the A/D converter, these amplitude values contain quantization errors. In the regression-line calculating unit 123, waveform data $Y_1 - Y_n$ at addresses $X_1 - X_n$ of a plurality of points (n points) in the vicinity of the address of this virtual zero-crossing point are read from the waveform storage section 11 so as to determine a regression line. These data plotted are shown in FIG. 7. At that time, a gradient a of the regression line is expressed by the following formula:

$$a = [n\Sigma(X_i Y_i) - \Sigma Y_i \Sigma X_i]/[n\Sigma(Y_i^2) - (\Sigma Y_i)^2]$$

In addition, the following formula is obtained as the zero crossing point z of the regression line:

$$z = [1/n] \cdot (\Sigma X_i - a\Sigma Y_i)$$

The zero-crossing point z thus determined from the regression line is set to the propagation-delay-time calculating section 13 as an estimated value of a real zero-crossing point. In the propagation-delay-time calculating section 13, a propagation delay time t is calculated by the following formula:

$$t = t_0 + z/f_s$$

where $t_0$ is a delay time from the time of issuance of a transmission trigger until the time when the write pulse is started, and $f_s$ is a sampling frequency of the A/D converter.

As described above, in this embodiment, since the zero-crossing point is calculated by the regression-line calculating unit 123, it is possible to reduce the quantization errors of both time and voltage which occur due to the sampling period and the amplitude resolution of the A/D converter, thereby making it possible to estimate the propagation delay time with high resolution.

Next, an examination will be made of the resolution in accordance with this embodiment by using specific numerical values. For instance, it is assumed that the frequency of the received wave is 80 kHz, the amplitude is ⅓ of the full span of the A/D converter, the number of bits of the A/D converter is 8 (resolution: 256), and its sampling frequency is 8 mHz. The resolution in a case where the regression-line calculating unit is not used is determined by the sampling frequency of the A/D converter, and is $1 / (8 \times 10^6) = 125$ ns. On the other hand, the resolution in this embodiment using the regression-line calculating unit can be expressed by (sampling frequency of the A/D converter) / [(gradient of the zero-crossing point) × (No. of items of data used)].

The gradient at the zero-crossing point is expressed by the difference in data between adjacent addresses, and if the received wave is approximated by a sinusoidal wave, the gradient becomes $(256/3) \sin [2\pi(80 \times 10^3) / (8 \times 10^6)] = 5.4$. If it is assumed that the number of items of data used in the regression-line calculation is 7, by substituting that number into the foregoing formula the resolution becomes $125 / (5.4 \times 7) = 3.3$ ns. Thus it can be appreciated that the resolution improves by 35-fold or more as compared with the case where the regression-line calculating unit is not provided.

Here, although the zero-crossing point in the above-described embodiment is set to be a point at which the code of the data changes from + to − as in the case of the point P shown in FIG. 3, the zero-crossing point may be alternatively set at a point at which the code changes from − to + as in the case of a point Q.

Figure 8:
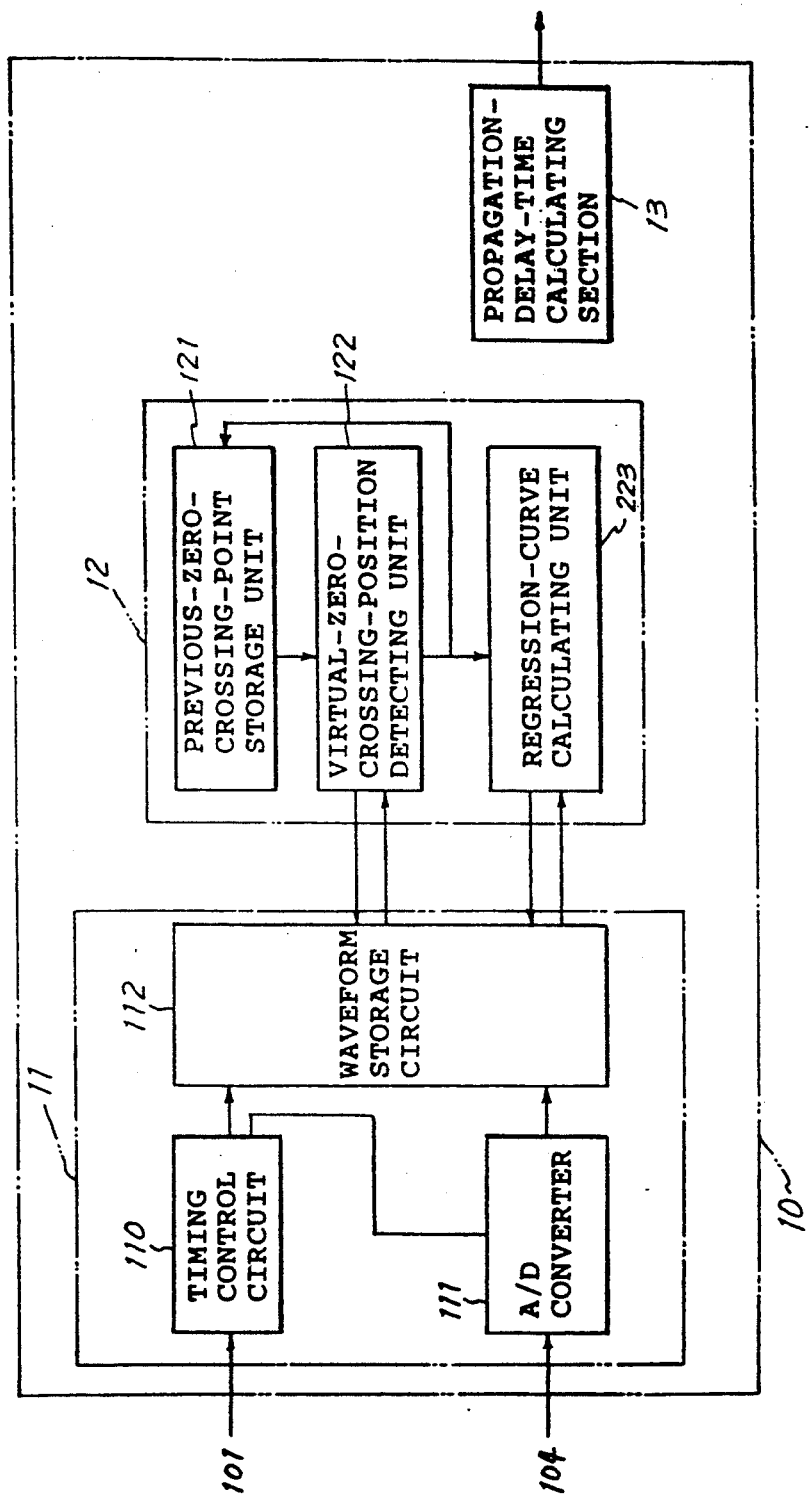
FIG. 8 is a block diagram, similar to FIG. 1, of a second embodiment of the present invention.
Figure 9:
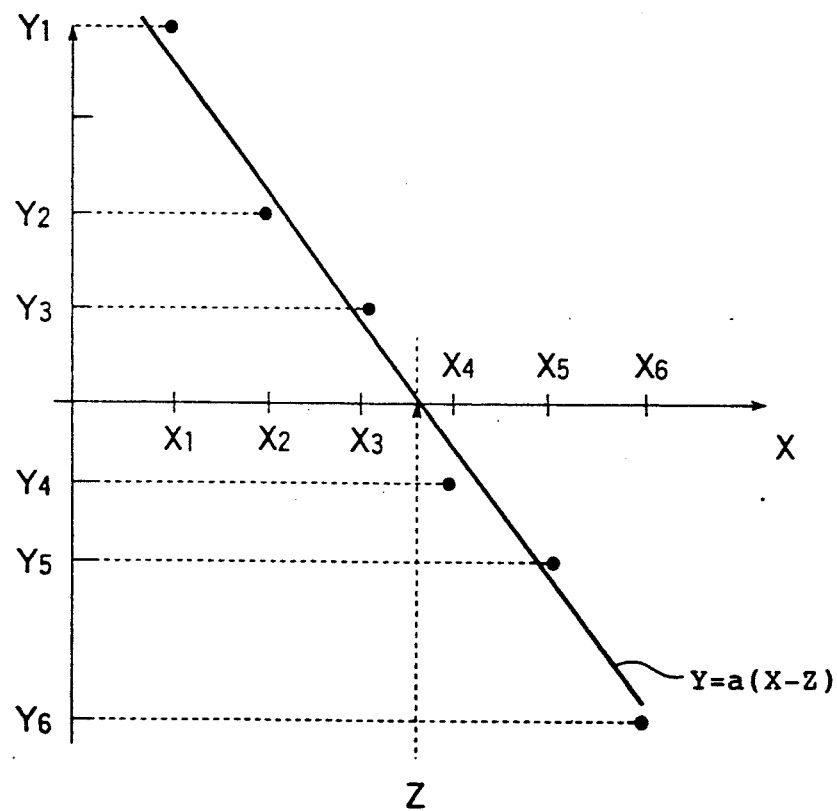
FIG. 9 is a diagram illustrating the operation of a regression-curve calculating unit shown in FIG. 8.

Although a regression-line interpolation is used in the foregoing first embodiment, the zero-crossing point may be determined as in a second embodiment shown in FIGS. 8 and 9. In the second embodiment, a regression-curve calculating unit 223 is used instead of the regression-line calculating unit 123, and the zero-crossing point is determined by means of a regression-curve interpolation. FIG. 9 is a diagram corresponding to FIG. 7 in which the data obtained with respect to the regression line is plotted.

To give a more detailed description, a formula of a regression curve with respect to the data of the waveform in the vicinity of a virtual zero-crossing point is set as $X = g(Y)$, and $g(Y)$ is set as a cubic curve shown as follows:

$$g(Y) = aY^3 + bY^2 + cY + d$$

Parameters a–d in the foregoing cubic curve are determined as a combination in which the sum of squares of the difference between n items of waveform data used in the interpolation becomes minimum. That is, it suffices if a value in which $E = \Sigma\{X_i - g(Y_i)\}^2$ becomes minimum is determined. At the point where E becomes minimum, values in which E is differentiated by the parameters a to d become zero, the following simultaneous equations 1 to 4 are obtained:

$$E = \Sigma\{X_i - g(Y_i)\}^2 \quad (1)$$
$$= \Sigma X_i^2 - 2\Sigma X_i g(Y_i) + \Sigma g^2(Y_i)$$

$$\frac{\partial E}{\partial d} = -2\Sigma X_i \frac{\partial g(Y_i)}{\partial d} + 2\Sigma g(Y_i) \frac{\partial g(Y_i)}{\partial d}$$

$$\frac{\partial g(Y_i)}{\partial d} = \frac{1}{\partial d}(aY_i^3 + bY_i^2 + cY_i + d) = 1$$

$$\therefore \frac{\partial E}{\partial d} = -2\Sigma X_i + 2\Sigma g(Y_i) = 2\Sigma\{g(Y_i) - X_i\} = 0$$

$$\frac{\partial E}{\partial c} = -2\Sigma X_i \frac{\partial g(Y_i)}{\partial c} + 2\Sigma g(Y_i) \frac{\partial g(Y_i)}{\partial c} \quad (2)$$

$$\frac{\partial g(Y_i)}{\partial c} = \frac{1}{\partial c}(aY_i^3 + bY_i^2 + cY_i + d) = Y_i$$

$$\therefore \frac{\partial E}{\partial c} = -2\Sigma X_i Y_i + 2\Sigma g(Y_i)Y_i = 2\Sigma Y_i\{g(Y_i) - X_i\} = 0$$

$$\frac{\partial E}{\partial b} = -2\Sigma X_i \frac{\partial g(Y_i)}{\partial b} + 2\Sigma g(Y_i) \frac{\partial g(Y_i)}{\partial b} \quad (3)$$

$$\frac{\partial g(Y_i)}{\partial b} = \frac{1}{\partial b}(aY_i^3 + bY_i^2 + cY + d) = Y_i^2$$

$$\therefore \frac{\partial E}{\partial b} = -2\Sigma X_i Y_i^2 + 2\Sigma g(Y_i)Y_i^2 = 2\Sigma Y_i^2\{g(Y_i) - X_i\} = 0$$

$$\frac{\partial E}{\partial a} = -2\Sigma X_i \frac{\partial g(Y_i)}{\partial a} + 2\Sigma g(Y_i) \frac{\partial g(Y_i)}{\partial a} \quad (4)$$

$$\frac{\partial g(Y_i)}{\partial a} = \frac{1}{\partial a}(aY_i^3 + bY_i^2 + cY + d) = Y_i^3$$

$$\therefore \frac{\partial E}{\partial a} = -2\Sigma X_i Y_i^3 + 2\Sigma g(Y_i)Y_i^3 = 2\Sigma Y_i^3\{g(Y_i) - X_i\} = 0$$

From Equation (1), $\Sigma g(Y_i) = \Sigma X_i$, and from the definition of $g(Y_i)$ $$a \cdot \Sigma Y_i^3 + b\Sigma Y_i^2 + c\Sigma Y + d\Sigma 1 = \Sigma X_i \quad (5)$$

From Equation (2), $\Sigma Y_i g(Y_i) = \Sigma Y_i X_i$, and from the definition of $g(Y_i)$ $$a \cdot \Sigma Y_i^4 + b\Sigma Y_i^3 + c\Sigma Y_i^2 + d\Sigma Y_i = \Sigma Y_i X_i \quad (6)$$

From Equation (3), $\Sigma Y_i^2 g(Y_i) = \Sigma Y_i^2 X_i$, and from the definition of $g(Y_i)$ $$a \cdot \Sigma Y_i^5 + b\Sigma Y_i^4 + c\Sigma Y_i^3 + d\Sigma Y_i^2 = \Sigma Y_i^2 X_i \quad (7)$$

From Equation (4), $\Sigma Y_i^3 g(Y_i) = \Sigma Y_i^3 X_i$, and from the definition of $g(Y_i)$ $$a \cdot \Sigma Y_i^6 + b\Sigma Y_i^5 + c\Sigma Y_i^4 + d\Sigma Y_i^3 = \Sigma Y_i^3 X_i \quad (8)$$

If the foregoing equations are rewritten as a determinant, the determinant is expressed as the following Formula (9):

$$\begin{vmatrix} \Sigma Y_i^3 & \Sigma Y_i^2 & \Sigma Y_i \\ \Sigma Y_i^4 & \Sigma Y_i^3 & \Sigma Y_i^2 \\ \Sigma Y_i^5 & \Sigma Y_i^4 & \Sigma Y_i^3 \\ \Sigma Y_i^6 & \Sigma Y_i^5 & \Sigma Y_i^4 \end{vmatrix} \begin{vmatrix} \Sigma 1 \\ \Sigma Y_i \\ \Sigma Y_i^2 \\ \Sigma Y_i^3 \end{vmatrix} \begin{vmatrix} a \\ b \\ c \\ d \end{vmatrix} = \begin{vmatrix} \Sigma X_i \\ \Sigma Y_i X_i \\ \Sigma Y_i^2 X_i \\ \Sigma Y_i^3 X_i \end{vmatrix} \quad (9)$$

By solving the foregoing determinant, the parameters a–d of the regression curve are determined, since the X coordinate at the zero-crossing point of the regression curve is a value in which Y=0 in the formula of g(Y). Hence, from the definition of g(Y), it follows that g(Y)= $aY^3+bY^2+cY+d$, and g(0)=d. That is, g(Y) becomes the value of the parameter d itself. Here, according to the Cramer's rule the value of the parameter d can be determined as shown in Formula (10).

$$d = \frac{\begin{vmatrix} \Sigma Y_i^3 & \Sigma Y_i^2 & \Sigma Y_i & \Sigma X_i \\ \Sigma Y_i^4 & \Sigma Y_i^3 & \Sigma Y_i^2 & \Sigma Y_i X_i \\ \Sigma Y_i^5 & \Sigma Y_i^4 & \Sigma Y_i^3 & \Sigma Y_i^2 X_i \\ \Sigma Y_i^6 & \Sigma Y_i^5 & \Sigma Y_i^4 & \Sigma Y_i^3 X_i \end{vmatrix}}{\begin{vmatrix} \Sigma Y_i^3 & \Sigma Y_i^2 & \Sigma Y_i & \Sigma 1 \\ \Sigma Y_i^4 & \Sigma Y_i^3 & \Sigma Y_i^2 & \Sigma Y_i \\ \Sigma Y_i^5 & \Sigma Y_i^4 & \Sigma Y_i^3 & \Sigma Y_i^2 \\ \Sigma Y_i^6 & \Sigma Y_i^5 & \Sigma Y_i^4 & \Sigma Y_i^3 \end{vmatrix}} \quad (10)$$

Thus, in the case where the regression-line interpolation of the first embodiment is substituted by the regression-curve interpolation, the regression accuracy can be improved further, and the number of points n of the data used in the interpolation can be increased. Consequently, it is possible to obtain higher resolution. In addition, it is possible to cope with a case where the sampling period is made slightly longer, and the deterioration of accuracy entailed therefrom is small.

In addition, if moving-average processing is effected with respect to a plurality of propagation delay times determined through a plurality of receptions, it is possible to improve the resolution even further.

As described above, in the present invention, it is possible to provide an improved ultrasonic transducer in that the zero-crossing point of the trigger wave can be estimated with high resolution by virtue of the function of the regression-line calculating unit or the regression-curve calculating unit, and that the resolution and reliability of the propagation delay time of ultrasonic waves calculated can be enhanced remarkably.

What is claimed is:

1. An ultrasonic transducer comprising:
   an ultrasonic transmitter;
   an ultrasonic receiver; and
   propagation-delay-time calculating means for calculating a propagation delay time from the time when an ultrasonic wave is transmitted by said transmitter until the time when the ultrasonic wave is received by said receiver,
wherein said propagation-delay-time calculating means includes: a waveform storage section in which a waveform signal of the ultrasonic wave received by said ultrasonic receiver is converted to a digital value after sampling at a predetermined timing and is stored sequentially; a virtual-zero-crossing-position detecting unit for detecting a virtual zero-crossing point on the basis of the waveform signal stored; a regression-line calculating unit for estimating a zero-crossing point of the received wave by fetching from said waveform storage section waveform data at a plurality of addresses centering on an address shown by an output of said virtual-zero-crossing-position detecting unit, and by effecting a regression-line interpolation with respect to the waveform data; and a propagation-delay-time calculating section for calculating the propagation delay time of the ultrasonic wave received on the basis of the zero-crossing point estimated.

2. An ultrasonic transducer according to claim 1, wherein said waveform storage section comprises: a timing control circuit for generating a write pulse train; an A/D converter which, after receiving as its input the waveform signal of the ultrasonic wave received, converts the same into a waveform data train and outputs the waveform data train; and a waveform storage circuit for storing the waveform data train in synchronism with the write pulse train and for outputting the waveform data train in response to a request from said virtual-zero-crossing-position detecting unit.

3. An ultrasonic transducer according to claim 1, wherein said virtual-zero-crossing-position detecting unit is adapted to determine the virtual zero-crossing point on the basis of a previous virtual zero-crossing point, and the previous virtual zero-crossing point is stored in a previous-zero-crossing-point storage unit juxtaposed to said virtual-zero-crossing-point storage unit.

4. An ultrasonic transducer according to claim 3, wherein said previous-zero-crossing-point storage unit has a function whereby, by assuming that a first-appearing wave ridge in a combination of adjacent ones of wave ridges of the wave, constituting the waveform data received, which displays a maximum ratio of peak values is set as a trigger wave, said previous-zero-crossing-point storage unit stores as the previous zero-crossing point a point at which a code of the address heading in a forward direction from the peak of the trigger wave changes, the previous zero-crossing point being updated by a present virtual zero-crossing point detected by said virtual-zero-crossing-position detecting unit.

5. An ultrasonic transducer according to claim 3, wherein said virtual-zero-crossing-position detecting unit has a function of determining waveform data W $(Z_{p-1})$ at the same address as a previous-zero-crossing-point address $Z_{p-1}$ on the basis of the present waveform data, a function of setting as the virtual zero-crossing point an address at which the code of relevant waveform data changes from positive to negative when the waveform data W $(Z_{p-1})$ is positive or 0, and a function of setting as the virtual zero-crossing point an address at which the code of relevant waveform data changes from negative to positive when the waveform data W $(Z_{p-1})$ is negative.

6. An ultrasonic transducer comprising:
   an ultrasonic transmitter;
   an ultrasonic receiver; and
   propagation-delay-time calculating means for calculating a propagation delay time from the time when an ultrasonic wave is transmitted by said transmitter until the time when the ultrasonic wave is received by said receiver,
wherein said propagation-delay-time calculating means includes: a waveform storage section in which a waveform signal of the ultrasonic wave received by said ultrasonic receiver is converted to a digital value after sampling at a predetermined timing and is stored sequentially; a virtual-zero-crossing-position detecting unit for detecting a virtual zero-crossing point on the basis of the waveform signal stored; a regression-curve calculating unit for estimating a zero-crossing point of the received wave by fetching from said waveform storage section waveform data at a plurality of addresses centering on an address shown by an output of said virtual-zero-crossing-position detecting unit, and by effecting a regression-curve interpolation with respect to the waveform data; and a propagation-delay-time calculating section for calculating the propagation delay time of the ultrasonic wave received on the basis of the zero-crossing point estimated.

7. An ultrasonic transducer according to claim 6, wherein said waveform storage section comprises: a timing control circuit for generating a write pulse train; an A/D converter which, after receiving as its input the waveform signal of the ultrasonic wave received, converts the same into a waveform data train and outputs the waveform data train; and a waveform storage circuit for storing the waveform data train in synchronism with the write pulse train and for outputting the waveform data train in response to a request from said virtual-zero-crossing-position detecting unit.

8. An ultrasonic transducer according to claim 6, wherein said virtual-zero-crossing-position detecting unit is adapted to determine the virtual zero-crossing point on the basis of a previous virtual zero-crossing point, and the previous virtual zero-crossing point is stored in a previous-zero-crossing-point storage unit juxtaposed to said virtual-zero-crossing-point storage unit.

9. An ultrasonic transducer according to claim 8, wherein said previous zero-crossing-point storage unit has a function whereby, by assuming that a first-appearing wave ridge in a combination of adjacent ones of wave ridges of the wave, constituting the waveform data received, which displays a maximum ratio of peak values is set as a trigger wave, said previous-zero-crossing-point storage unit stores as the previous zero-crossing point a point at which a code of the address heading in a forward direction from the peak of the trigger wave changes, the previous zero-crossing point being updated by a present virtual zero-crossing point detected by said virtual-zero-crossing-position detecting unit.

10. An ultrasonic transducer according to claim 8, wherein said virtual-zero-crossing-position detecting unit has a function of determining waveform data W $(Z_{p-1})$ at the same address as a previous-zero-crossing-point address $Z_{p-1}$ on the basis of the present waveform data, a function of setting as the virtual zero-crossing point an address at which the code of relevant waveform data changes from positive to negative when the waveform data W $(Z_{p-1})$ is positive or 0, and a function of setting as the virtual zero-crossing point an address at which the code of relevant waveform data changes from negative to positive when the waveform data W $(Z_{p-1})$ is negative.

* * * * *

UNITED STATES PATENT AND TRADEMARK OFFICE
CERTIFICATE OF CORRECTION

PATENT NO. : 5,206,838
DATED : April 27, 1993
INVENTOR(S) : Y. KASHIWASE

It is certified that error appears in the above-indentified patent and that said Letters Patent is hereby corrected as shown below:

On title page, item [57] Abstract, lines 14-15,
 change "regression curve" to ---regression-curve---.
     At column 1, line 14, change "transducer.," to ---transducer,---.
     At column 4, line 57, change "zero crossing" to ---zero-crossing---.
     At column 5, line 49, change "regression-.curve" to ---regression-curve---.
     At column 9, line 26 (claim 9, line 2), change "previous zero-crossing-point" to ---previous-zero-crossing-point---.

Signed and Sealed this

Twenty-sixth Day of July, 1994

Attest:

BRUCE LEHMAN

*Attesting Officer*    *Commissioner of Patents and Trademarks*